(12) United States Patent
Xia et al.

(10) Patent No.: US 7,808,622 B2
(45) Date of Patent: *Oct. 5, 2010

(54) FIBER RACK ASSEMBLY AND ASSOCIATED TESTING SYSTEM

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/856,928

(22) Filed: Sep. 18, 2007

(65) Prior Publication Data

US 2009/0073424 A1    Mar. 19, 2009

(51) Int. Cl.
*G01N 21/00* (2006.01)
(52) U.S. Cl. ..................................... 356/73.1
(58) Field of Classification Search ............... None
See application file for complete search history.

(56) References Cited

U.S. PATENT DOCUMENTS

| 4,996,420 A | * | 2/1991 | Redford | ............... 250/227.24 |
| 7,102,738 B2 | * | 9/2006 | Matsuura et al. | ............ 356/73.1 |
| 7,574,082 B2 | * | 8/2009 | Xia et al. | ..................... 385/32 |

* cited by examiner

*Primary Examiner*—Tu T Nguyen

(57) ABSTRACT

A fiber rack assembly is provided. The assembly includes at least one patch panel having adapters configured to couple a first plurality of fibers to a second plurality of fibers and a test system for measuring the optical power lever of the fibers. The test system may include a base and a sensor. The base may define a plurality of test sites. Each test site is configured to support a portion of a fiber. The sensor is movable to one or more test sites and, at each test site, is configured to measure a macro-bending loss at the portion of the fiber supported at the test site as an indication of an optical power level of the fiber. The test system may also have interface panel that includes user inputs and a display.

23 Claims, 17 Drawing Sheets

Curve shape for macro-bending

FIBER RACK ASSEMBLY AND ASSOCIATED TESTING SYSTEM

BACKGROUND INFORMATION

In general, an optical fiber patch panel rack assembly includes several adapters for connecting and routing fiber optic cables to each other and various network components. An optical fiber network may have numerous rack assemblies. For example, an optical fiber network of an inter-exchange carrier ("IXC") may include thousands of rack assemblies and each rack assembly may have as many as one thousand adapters for making fiber connectors.

A common maintenance activity related to fiber networks is determining the source of a power disruption by having a technician unplug a fiber lead, use a power meter to measure the power from the unplugged fiber lead, and then replug the fiber lead. If the troubled path has several fiber connections in serial, the technician has to check each point one by one. The process is time consuming. Moreover, disconnecting and reconnecting a fiber connection does not guarantee the connection is as good as the previous one, hence disconnecting a fiber is not recommended unless it is necessary. Another drawback with the current process is the service disruption created during the unplugging and replugging of the fiber leads.

BRIEF DESCRIPTION OF THE SEVERAL VIEWS OF THE DRAWING(S)

FIG. 3b is a side cross-sectional view of the fiber rack assembly of FIG. 3a;

FIG. 4b is a side cross-sectional view of the fiber rack assembly of FIG. 4a;

FIG. 12b illustrates a sensor engaging the test site of FIG. 12a;

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Figure 1:
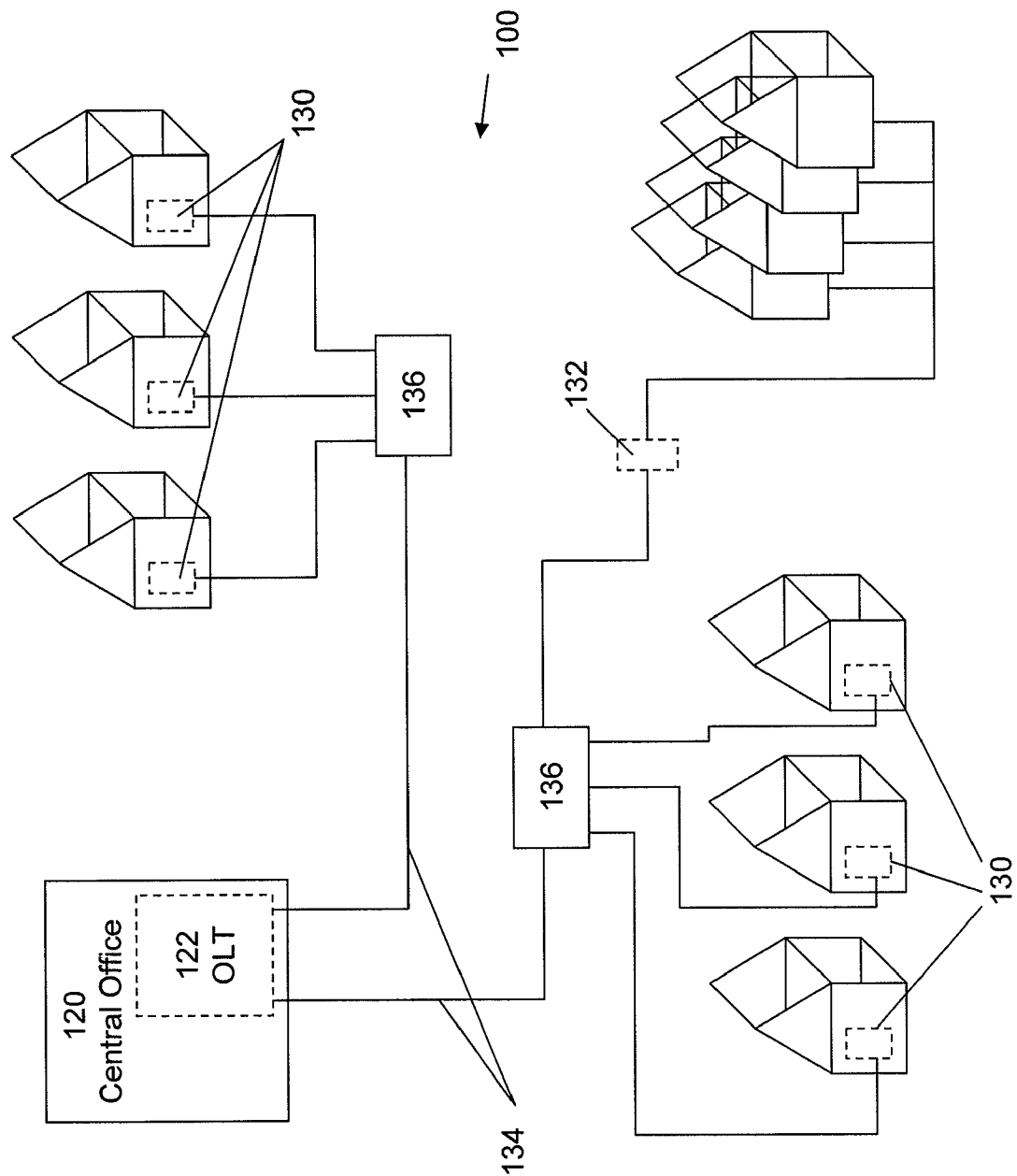
FIG. 1 is a block diagram of an optical fiber network consistent with an exemplary embodiment.

One or more fiber rack assemblies may operate within or in connection with an optical fiber network. For example, the fiber rack assemblies described herein may be part of a fiber to the premises (FTTP), also referred to as fiber to the home (FTTH), system using passive optical networks. Referring to FIG. 1, a FTTP system may include or otherwise be in communication with a provider's central office 120 that delivers optical signals to a plurality of subscribers through a passive optical network or PON 100. The passive optical network may 100 include an optical line terminal (OLT) 122 at the provider's central office and a plurality of optical network terminals (ONTs) 130 located at the premises of the subscribers, e.g. a customer home. The passive optical network may also include one or more optical network units (ONUs) 132 that function as gateways to additional sub-networks associated with other systems, such as fiber to the curb (FTTC) and fiber to the neighborhood (FTTN) systems.

In general, a fiber rack assembly includes several fiber adapters on one or more patch panels for connecting and routing fibers of optical fiber cables. A fiber rack assembly may also include an optical splitter device configured to receive a signal from one input optical fiber and split the signal among a plurality of output optical fibers. A PON may have one or more fiber rack assemblies located in various positions throughout the PON.

As an example and as illustrated in FIG. 1, an OLT 122 of the network can be connected to the ONTs 130 and ONUs 132 through a series of fiber optic cables 134 and one or more fiber rack assemblies 136.

Figure 2:
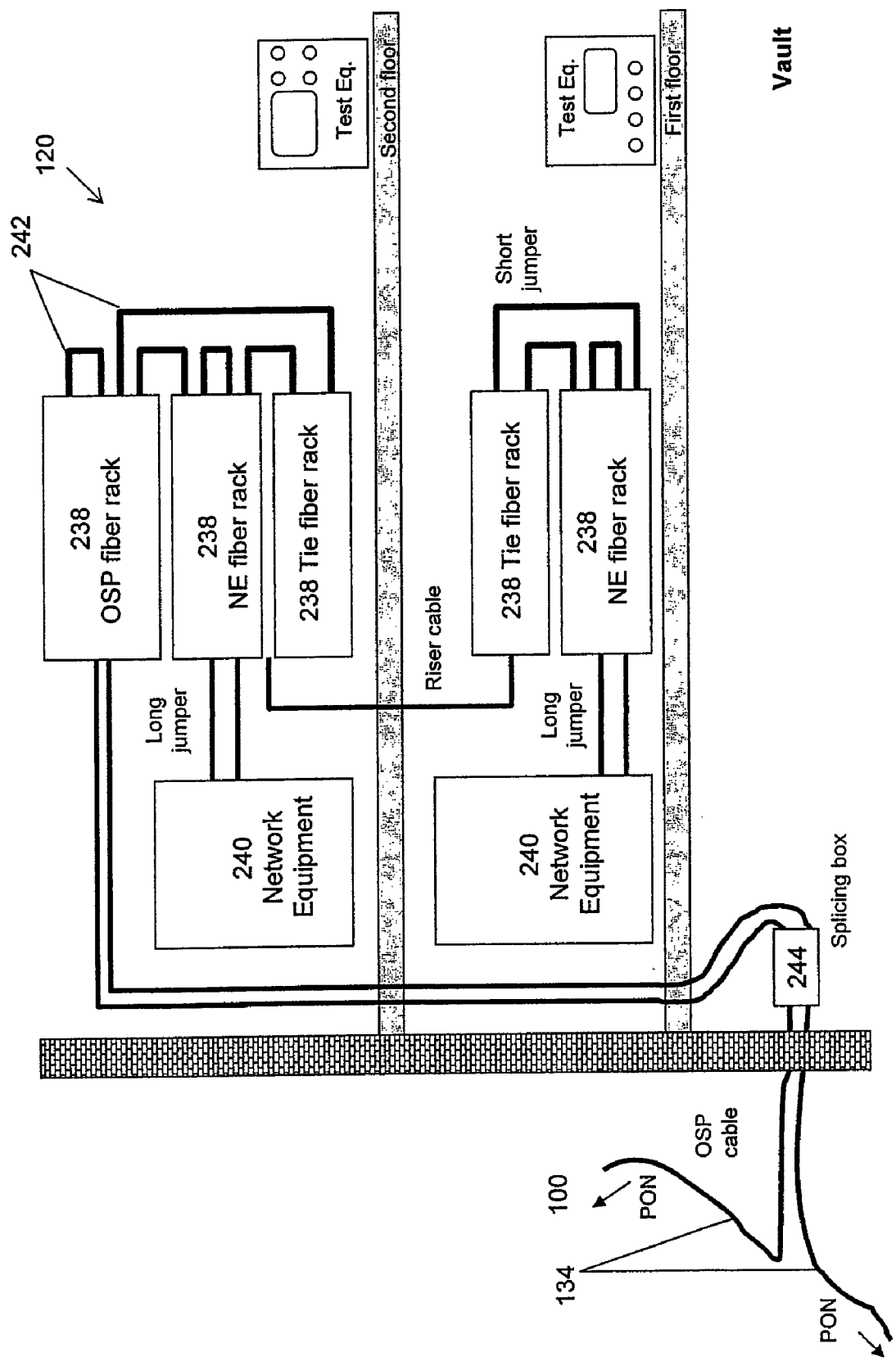
FIG. 2 is a schematic diagram of fiber rack assemblies in the context of a central office of a telecommunications company.

As another example and as illustrated in FIG. 2, the central office 120 may have one or more rack assemblies 238 for routing the fibers of fiber optic cables 134 from the PON 100 (or more particularly, according to this embodiment, a splicing component 244 of the PON) to various network components 240. One or more of the rack assemblies 238 may be interconnected through relatively short optical fiber cables referred to as to as jumpers 242. Jumpers 242 may also be used to connect the various network components 240 to one of the rack assemblies 238.

Figure 3B:
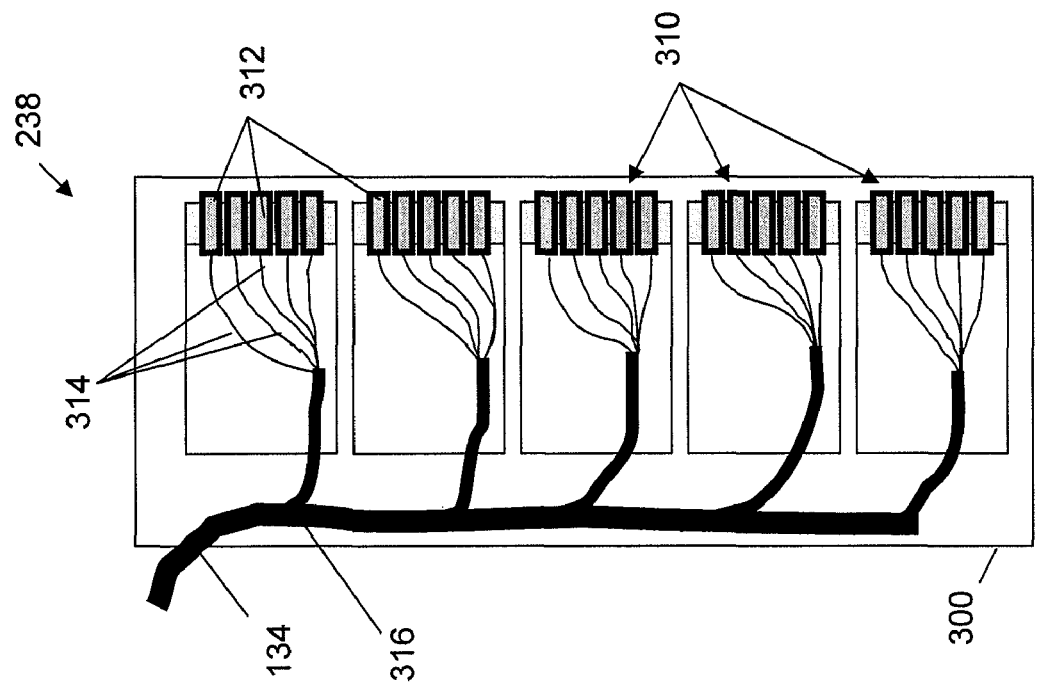
Figure 3A:
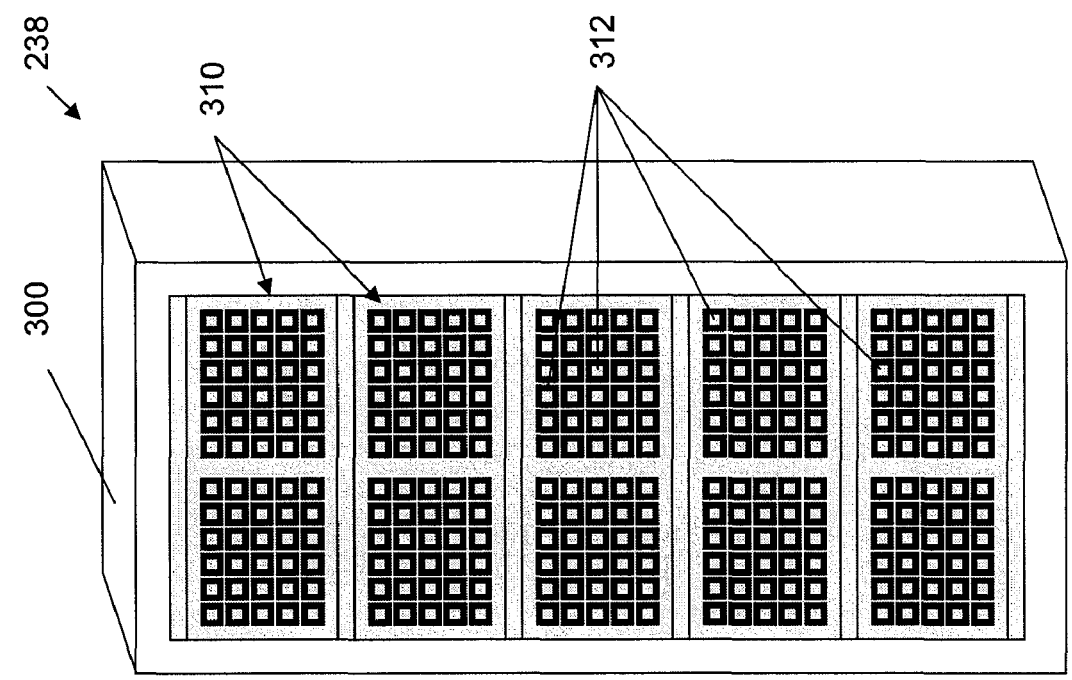
FIG. 3a is frontal perspective view of a fiber rack assembly.

Referring to FIGS. 3a and 3b, a rack assembly 238 may include a housing 300 that supports one or more patch panels 310. A patch panel 310 includes one or more adapters 312. The arrangement and number of adapters 312 per patch panel 310 may vary. For example and as illustrated, the adapters 312 may be arranged in a grid-like pattern, i.e., rows and columns, over the patch panel 310.

As shown best in FIG. 3b, a fiber optic cable 134 includes one or more fibers 314 and cladding element 316 surrounding the one or more fibers. Each fiber is configured to carry an optical signal. A fiber optic cable 134 may be routed to a rack assembly and the individual fibers 314 of the fiber optic cable 134 may be routed and connected to one of the adapters 312 of a patch panel 310.

In the embodiment of FIGS. 3a and 3b, the rack assembly 238 includes five stacked optical patch panels 310. The patch panels 310 may also be referred to as shelves. Each patch panel 310 extends along a front side of the rack assembly and the fiber optic cable 134 is routed to and at least partially into the interior of the rack assembly 238. Each fiber 314 of the fiber optic cable is routed to an adapter 312 from a back side of the rack assembly 136.

Each adapter 312 is configured to couple an end of a first fiber 314 to an end of a second fiber (not illustrated). The end of the second fiber may be connectorized, e.g., the end of the second fiber may include a connector configured to engage the adapter. The type of adapter 312 may vary. For example, the adapter may be a LC or a SC-type adapter.

Figure 4B:
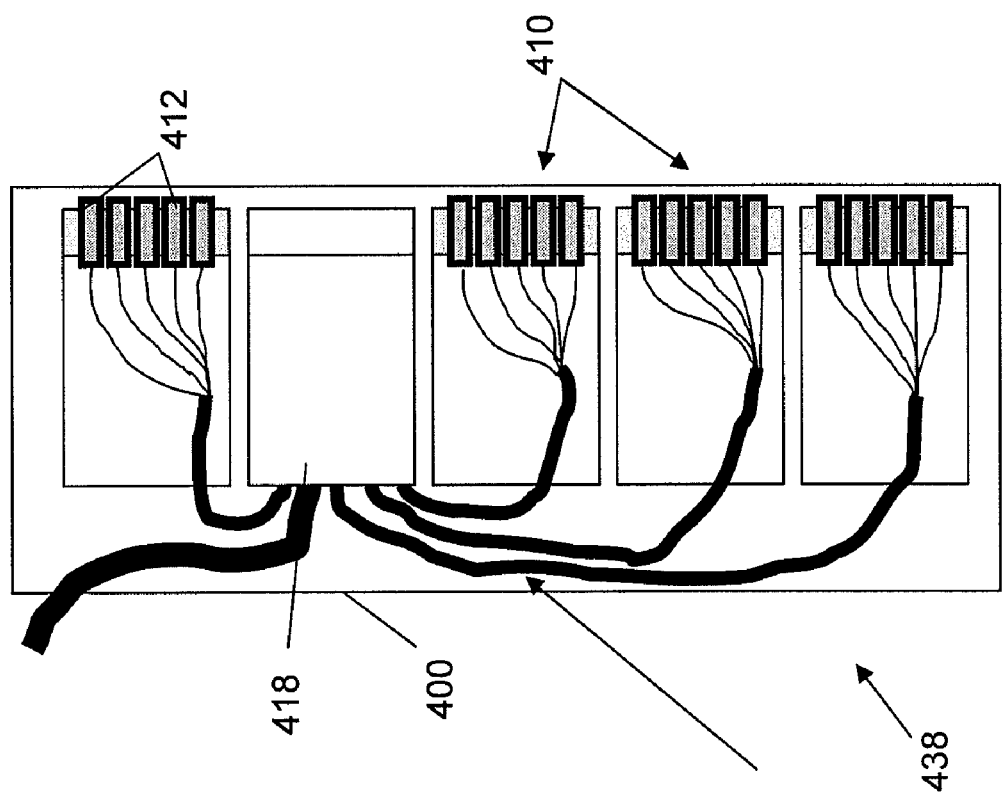
Figure 4A:
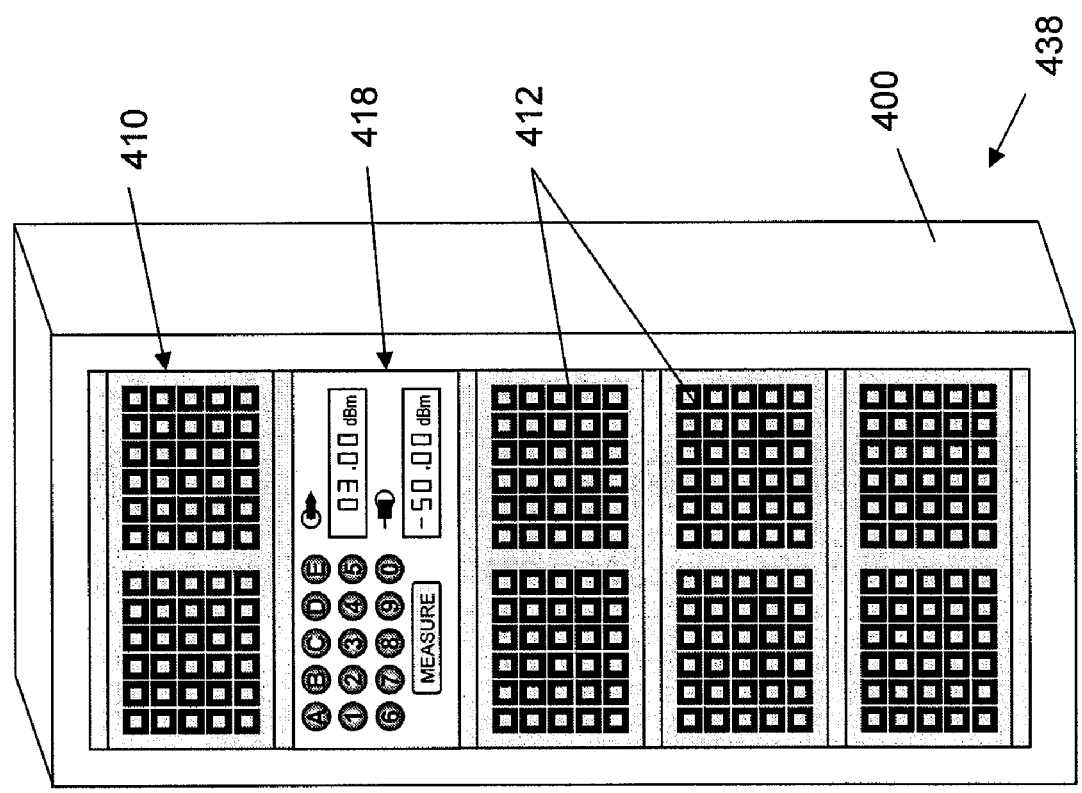
FIG. 4a is a frontal perspective view of a fiber rack assembly consistent with an embodiment.

FIGS. 4a and 4b illustrate rack assembly 438 consistent with an embodiment. The rack assembly 438 includes a housing 400, at least one optical patch panel 410, and a testing system 418. The housing 400 supports the optical patch panel 410 and the testing system 418. Each optical patch panel 410 includes one or more adapters 412. A fiber optic cable 134 may be routed to the rack assembly 438 and the individual fibers 414 may be routed to the adapters 412 at least partially through the testing system 418. The testing system 418 is configured to measure an optical power level for one or more of the fibers 414.

Figure 5:
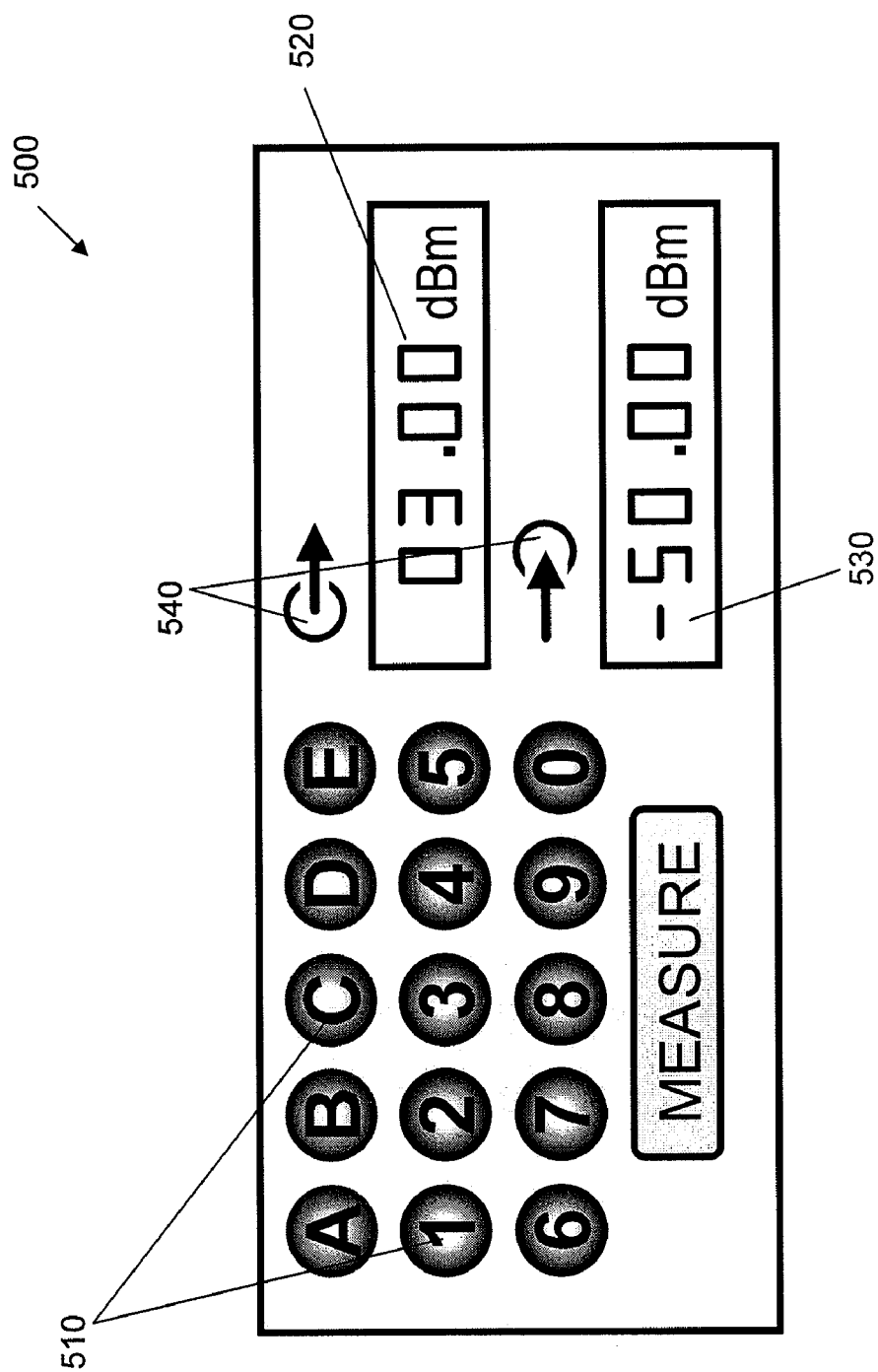
FIG. 5 is a frontal view of an interface panel consistent with an embodiment.

Referring to FIG. 5, the testing system 418 may include an interface panel 500. The interface panel 500 may be generally parallel to the optical patch panels 410 along the front side of the rack assembly. The interface panel 500 may include one or more user inputs 510. For example and as illustrated, the interface panel 500 may include numerical and/or letter keypads. The user may indicate which fiber he or she wants to be measured by entering the identity of the fiber through the keypad. The identity may be the position of the fiber or more specifically to the position (or port number) of the adapter that is in communication with the fiber. In the illustrated embodiment, each patch panel may by identified by a letter. For example, the top most patch panel may be "A" and the patch panel immediately below the "A" patch panel may be "B" and so on. Each adapter on a panel may be identified by numbers representing the column and row of the adapter. For example, the adapter in the top row and the first column may be "1, 1". After identifying the fiber, the user may be able to push a command button, such as the measure button illustrated in FIG. 5, and have the testing system measure the power level of the identified adapter or associated fiber. The interface panel 500 may also include one or more displays. For example, in the illustrated embodiment of FIG. 5, the interface panel 500 includes first and second displays 520, 530. The first display 520 may indicate the power level for a first direction toward the patch panel and the second display 530 may indicate the power level for a second direction away from the patch panel. The interface panel 500 may include indicia, such as stickers, paintings, or other labels, to provide additional information to the user. For example in the illustrated embodiment, directional arrows 540 are positioned near the displays 520, 530 to indicate the power direction of the measurement in the display.

Although FIG. 4a illustrates the interface panel such that it is accessible from the front of the rack assembly 438, the location of the interface panel may vary. For example, although the interface panel may be in communication with the rest of the testing system, the interface panel may not be within the housing of the rack assembly 438. As an example, the interface panel may communicate with the rest of the testing system remotely, such as through wireless signals.

Also, in other embodiments, the testing system may have more than one interface panel or may not have an interface panel.

Figure 6:
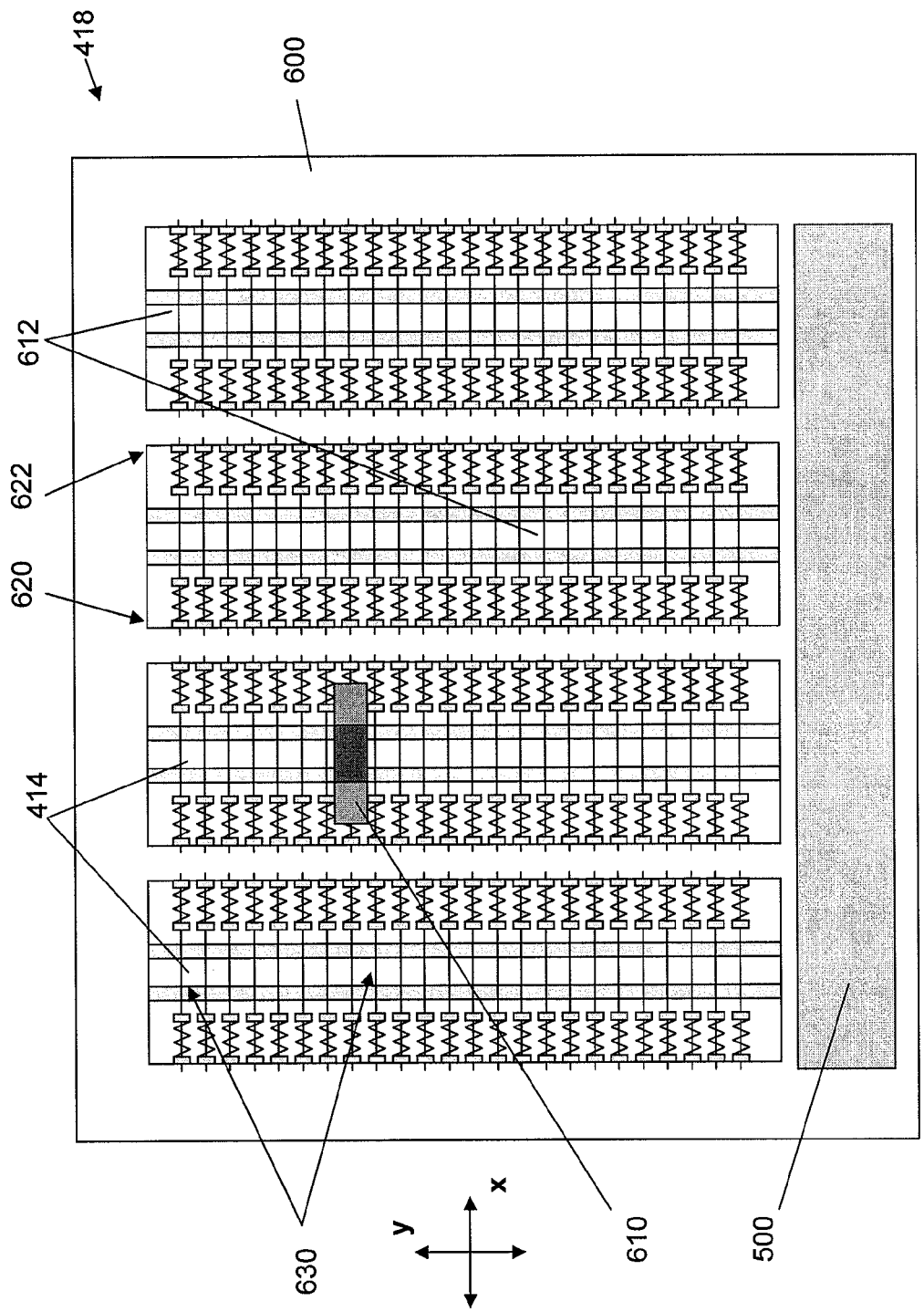
FIG. 6 illustrates a top view of a fiber array and a movable detector head consistent with an embodiment.

As illustrated in FIG. 6, the testing system 418 may further include a base 600 and at least one sensor 610. The base 600 may be configured to support a portion of each of the fibers 414 extending through the testing system 418. Each area of the base that supports a portion of a fiber 414 defines a test site 630 for that fiber. The sensor 610 is moveable to the test sites for measuring the power for the fibers. The arrangement of the test sites 630 may vary. According to the embodiment of FIG. 6, the test sites 630 are arranged in columns and rows corresponding to the adapters on the patch panel or panels.

Figure 7:
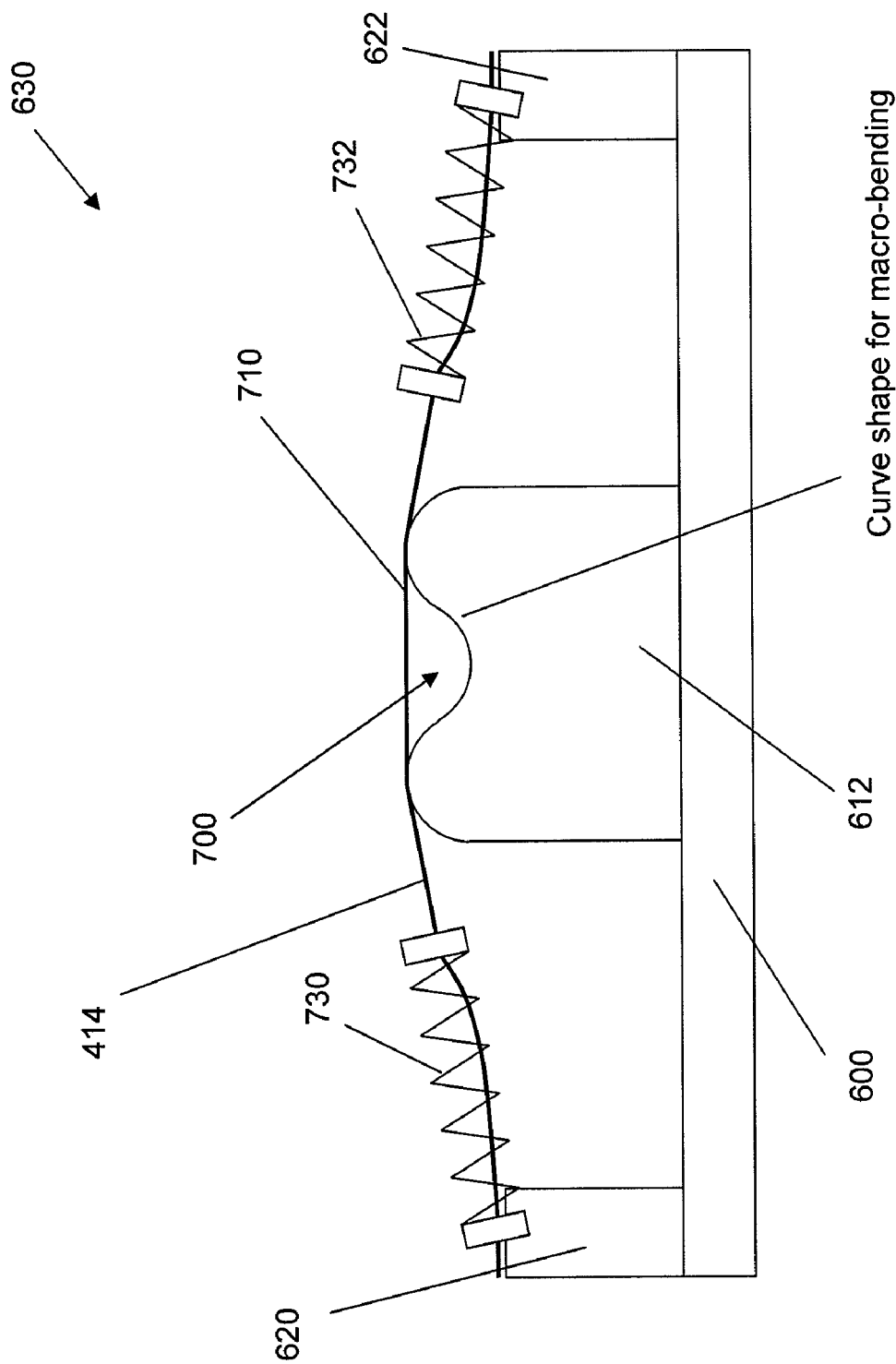
FIG. 7 illustrates a side schematic view of a test site consistent with an embodiment.
Figure 8:
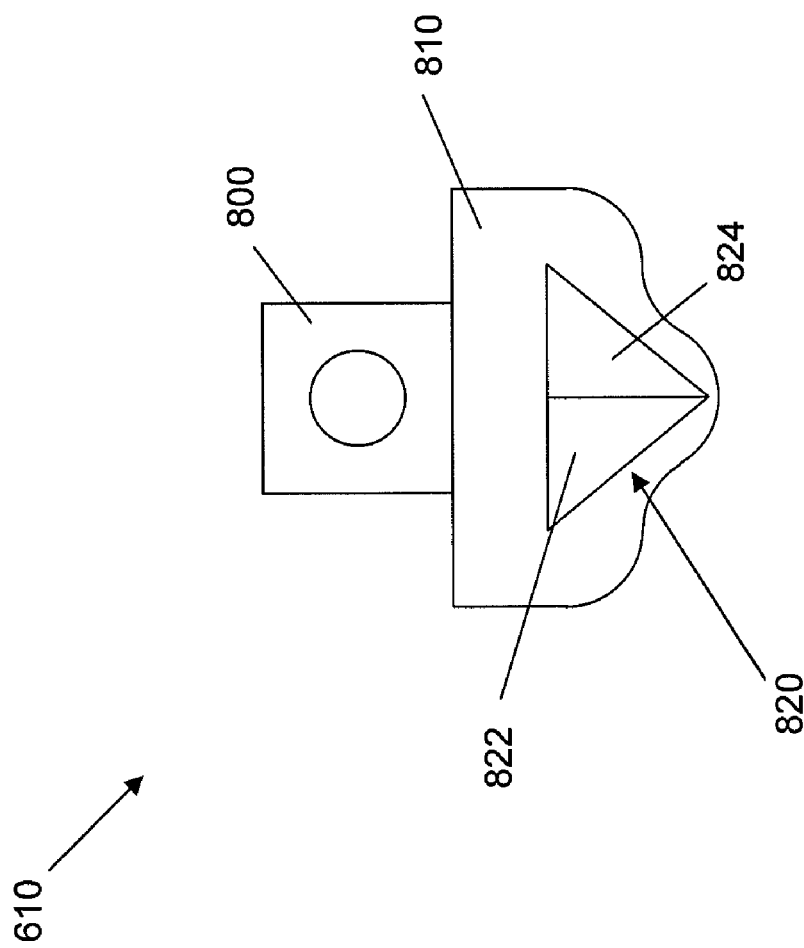
FIG. 8 illustrates a sensor consistent with an embodiment.

The base 600 may include one or more rails 612 and support members 620, 622 for forming the test sites 630. For example and according to the embodiment of FIG. 7, the rail 612 may have a concave profile defining a recessed area 700 and a portion 710 of the fiber may extend across that rail 612 including over the recessed area 700. On either side of the rail 612 may be additional support members 620, 622.

The base 600 may further include biasing members, such as springs. As an example, for each fiber, the base 600 may include a first spring 730 and a second spring 732. A first end of the first spring 730 may be connected to a first support member 620 and a second end of the first spring 730 may be connected to the fiber 414. A first end of the second spring member 732 may be connected to a second support member 622 (that is opposite the rail 612 from the first support element 620) and a second end of the second spring member 732 may be connected to the fiber 414. In general, the springs or other biasing members are configured to store slack within the fiber 414 such that if the portion 710 of the fiber over the recessed area 700 is pushed toward or along the top surface of the rail (e.g., into the recessed area 700) the fiber 414 has stored slack to minimize the stain in the fiber 414 from such a movement. Also, absence a force to move the portion 710 of the fiber into the recessed area 700, the springs or other biasing members bias the fiber 414 such that it has a minimal degree of curvature within the fiber 414 as it extends across the rail 612.

Figure 9:
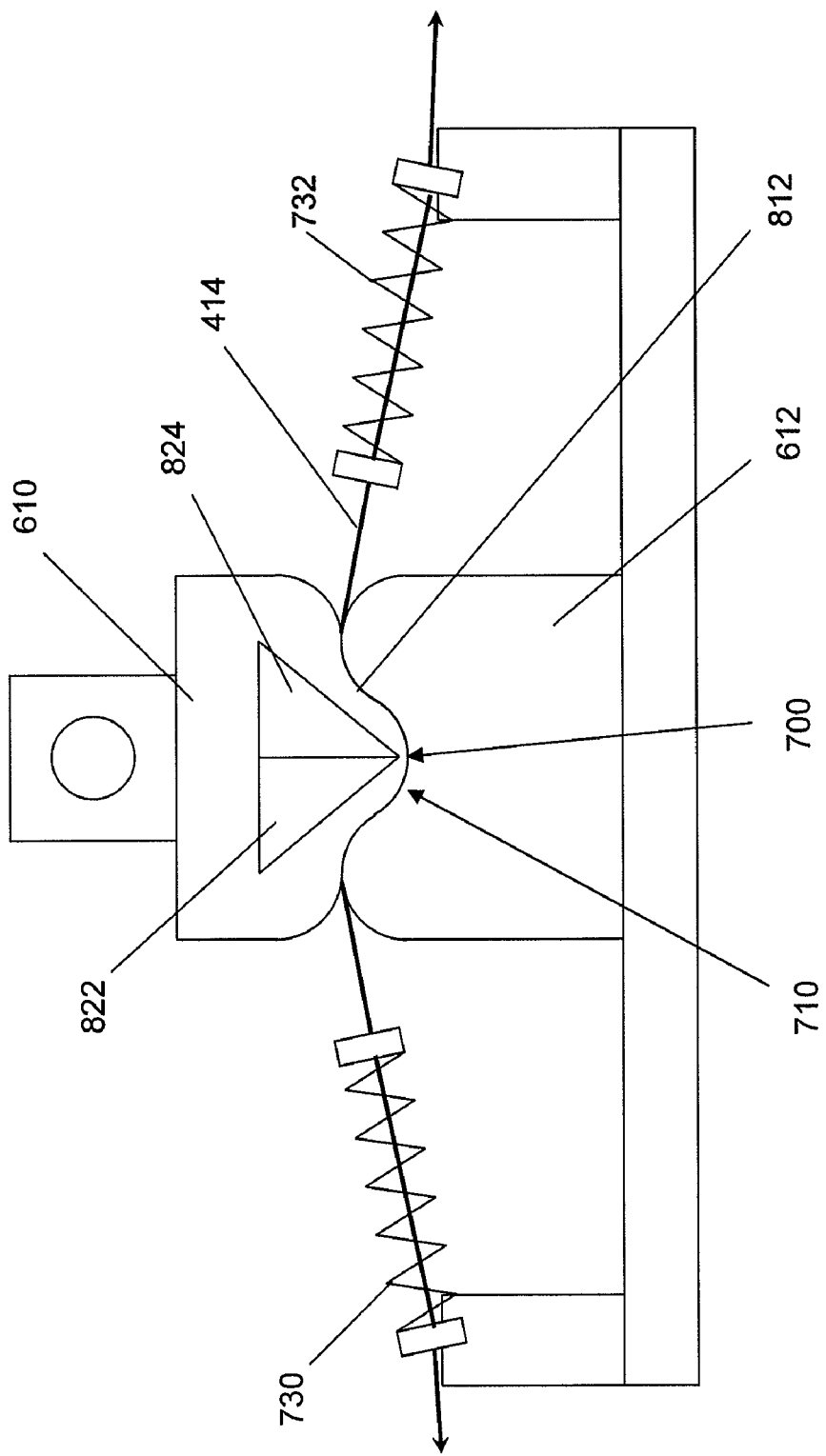
FIG. 9 illustrates the sensor of FIG. 8 engaging the test site of FIG. 7.

Referring to FIG. 9, the sensor 610 may include a positioner member 800, a shape member 810, and a photo detector 820. The positioner member 800 is in communication with a drive system (not illustrated in FIG. 9) configured to move the sensor to the different test sites. The shape member 810 may define a profile (e.g., a smooth continuous curve or curves) that corresponds to the profile of the rail 612 such that a bottom surface 812 of the shape member 810 may be pressed against a top surface of the rail 612, including the recessed area 700. The photo detector 820 may include a first detector member 822 and a second detector member 824. Each detector member 822, 824 is configured to sense a level of light. The detectors 822, 824 may be positioned such that the first detector member 822 is configured to sense a level of light coming from a first side of the sensor 610 and the second detector member 824 is configured to sense a level of light coming from a second side of the sensor 610.

FIG. 9 illustrates the sensor 610 engaging a test site for one of the fibers 414. The sensor 610 engages the portion 710 of the fiber over the rail 612 such that the portion of the fiber is pushed into the recessed area 700 of the rail creating a curve in the fiber 414. The curve in the fiber follows the recessed area 700 and the bottom surface 812 of the shape member of the sensor. The first and second springs 730, 732 are overcome by the pressure applied to the fiber 414 by the sensor 610 to allow the slack in the fiber 414 to be released. Curving the fiber 414 may create macro-bending losses. In general, macro-bending losses occur when a curve of a fiber 414 is great enough that a portion of the light from the optical signal traveling through the fiber 414 escapes through the sides of the fiber 414 rather than traveling along the fiber 414. The sensor 610 is configured to measure the macro-bending losses in order to provide an indication of the optical power level of the fiber. As described above, the two detector members 822, 824 are positioned such the macro-bending losses may be measured in both directions, e.g., coming from the patch panel or going toward the patch panel.

Figure 10:
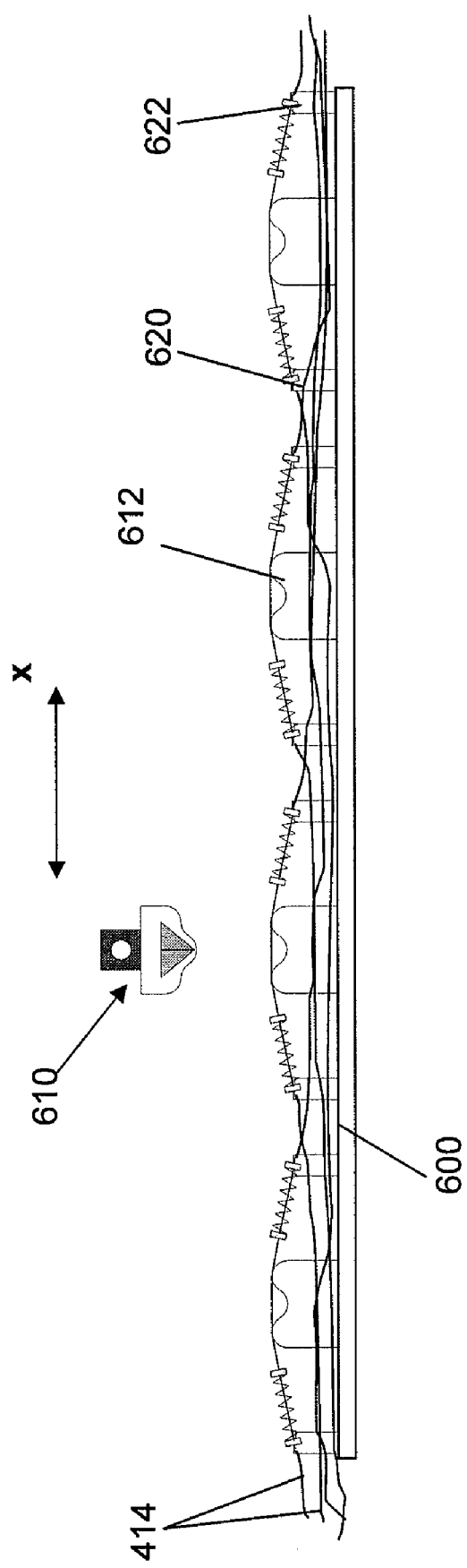
FIG. 10 is a schematic diagram of the interaction of the sensor of FIG. 8 and a row of test sites consistent with an embodiment.

As shown in FIG. 6, each pair of support members 620, 622 and a rail 612 may support several fibers links 414 along the lengths of the support members 620, 622 and rail 612 such that the support members 620, 622 and rail 612 define a column of test sites for the supported fibers of the column. FIG. 10 illustrates an example of the manner in which the different fibers 414 may be routed between columns. For any particular fiber 414, a portion of that fiber may be supported at least partially by a pair of support members 620, 622 and a rail 612 that represents a first column. For the other columns of support members 620, 622 and rails 612 that do not support that particular fiber 414, the fiber 414 may be routed through them. For example, the support members 620, 622 and rails 612 may include openings for routing fibers 414 not being supported by them. As another example, the base 600 may define openings for routing fibers 414 underneath some of the support members 620, 622 and rails 612.

Figure 11:
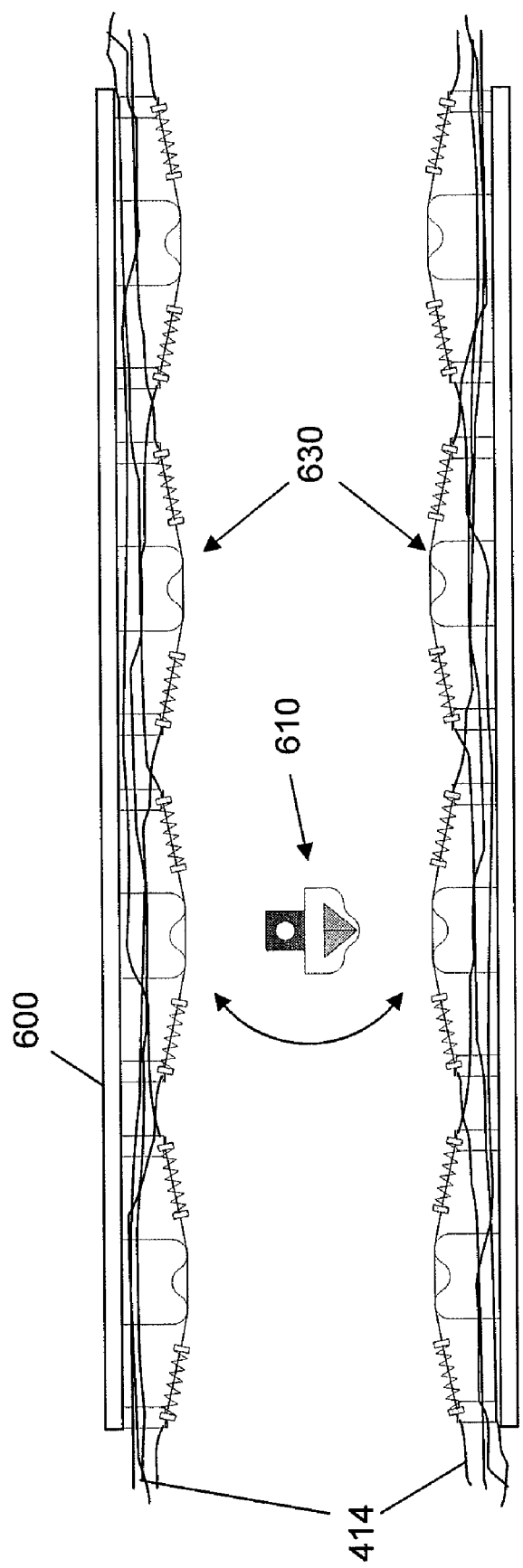
FIG. 11 is a schematic diagram of the interaction of the sensor of FIG. 8 and two rows of test sites consistent with an embodiment.

The number of sensors per test sites may vary. For example, each test site may have a dedicated sensor. In other embodiments, such as the ones illustrated, the rack assembly may include one sensor that is moveable between the plurality of test sites. As illustrated in FIGS. 6, 10, and 11, the sensor 610 may be moveable in one or more directions (e.g., x, y, z) in order to reach the different test sites.

Figure 12A:
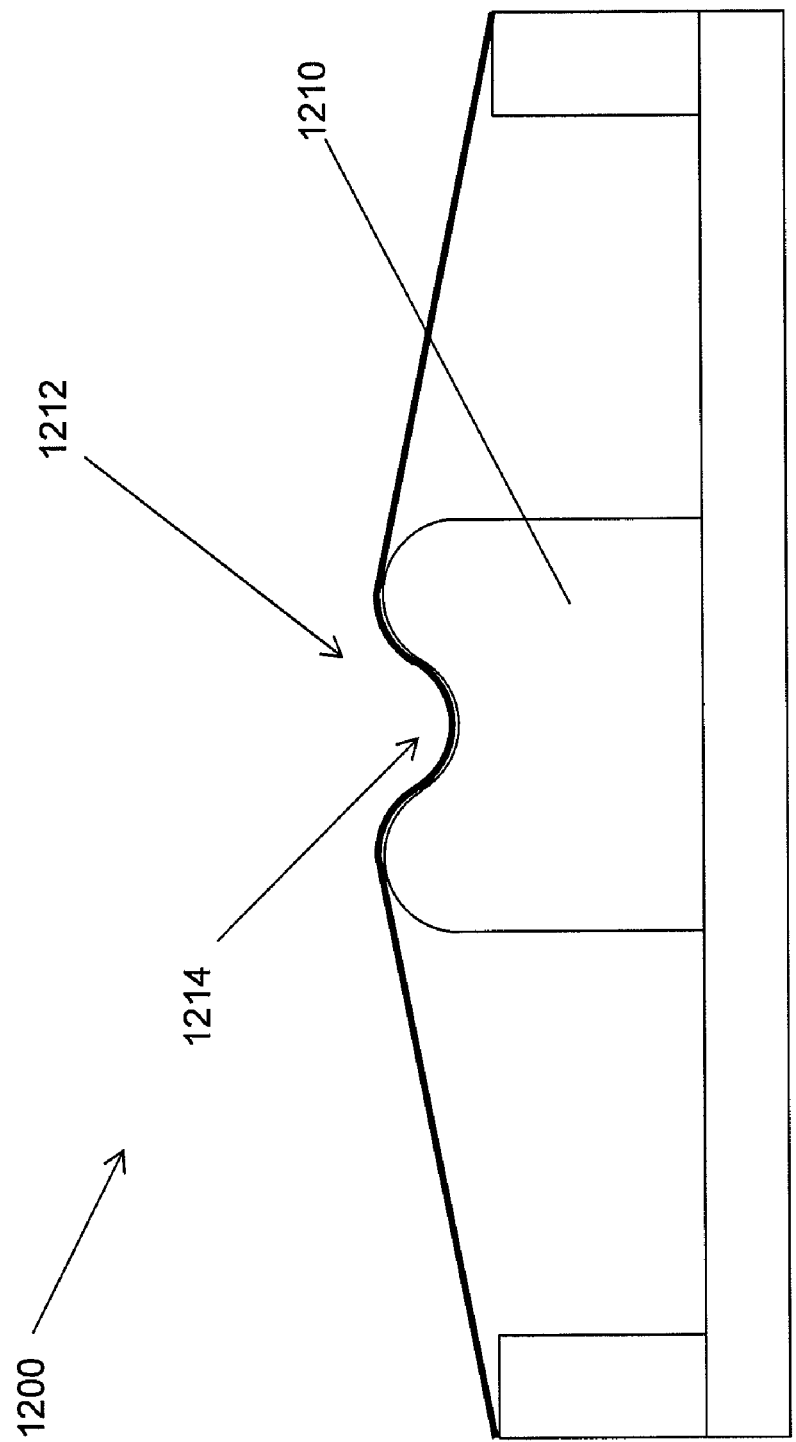
FIG. 12a illustrates a side schematic view of a test site consistent with an embodiment.

FIG. 12a illustrates another embodiment of a test site 1200 without the biasing members. According to this embodiment, the rail 1210 has a concave profile defining a recessed area 1214. A portion 1212 of the fiber may extend across and be partially supported by the recessed area 1214. More specifically, the portion 1212 of the fiber may extend partially along the top surface of the rail that defines the recessed area 1214 creating a curve in the fiber. The curve in the portion 1212 of the fiber may create macro-bending losses that may be measured as an indication of the optical power level in the fiber. The fiber may be held at least partially along the top surface by an adhesive or one or more fasteners.

Figure 12B:
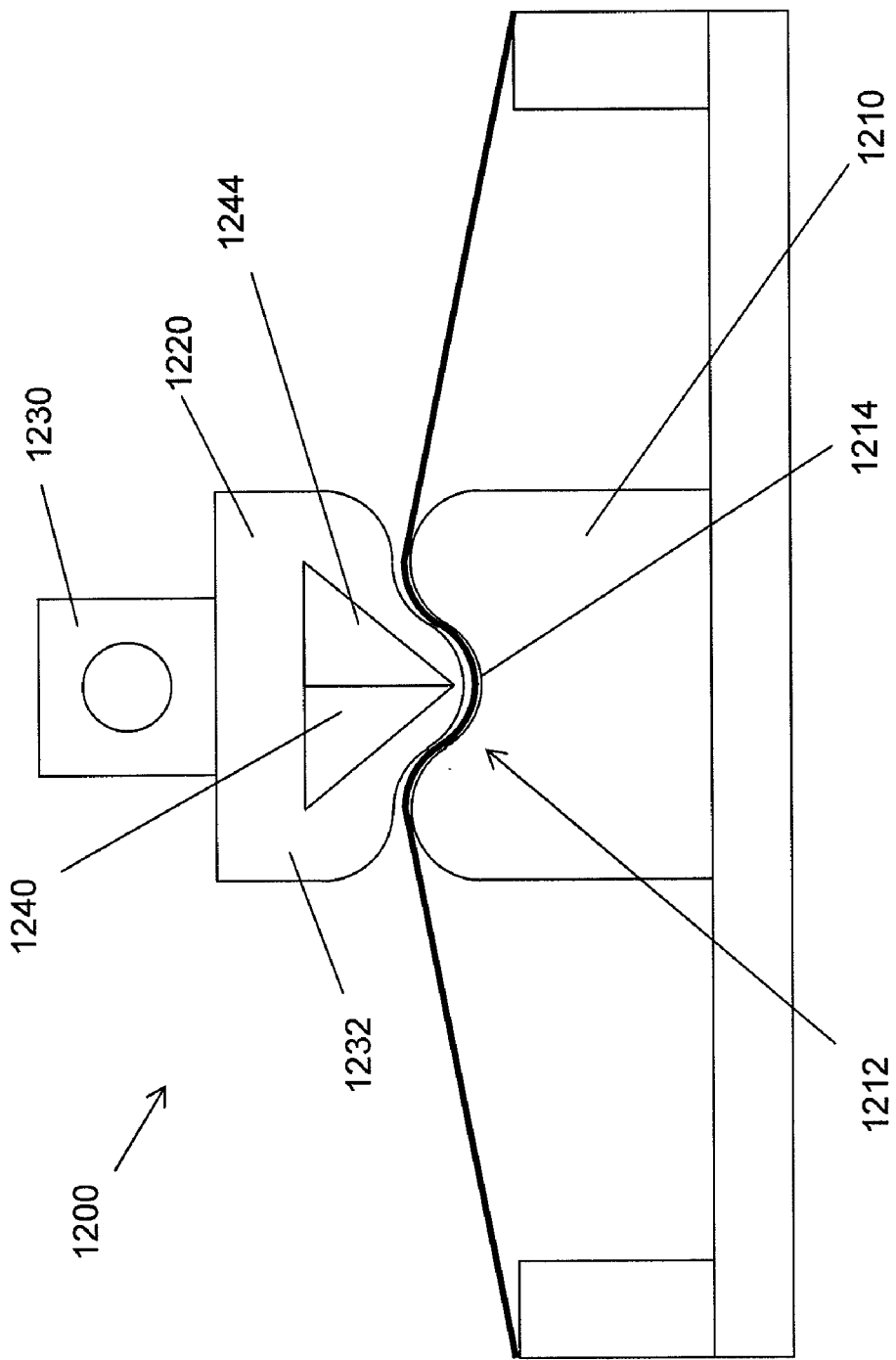

A sensor 1220 may measure the macro-bending losses created by the curve in the fiber. FIG. 12b illustrates a sensor 1220 engaging the test site to measure the macro-bending losses. The sensor 1220 according to the embodiment of FIG. 12b may include a positioner member 1230 in communication with a drive system (not illustrated in FIG. 12b) for moving the sensor 1220 to different test sites. The sensor 1220 may include a shape member 1232 that defines a profile that corresponds to the profile of the rail 1210 such that a bottom surface of the shape member 1232 may engage the top surface of the rail 1210, including the recessed area 1214. The sensor 1220 may also include a photo detector 1240 for measuring the macro-bending losses. The photo detector 1240 may include a first detector member 1242 for measuring light coming from a first side of the sensor 1220 and a second detector member 1244 for measuring light coming from a second side of the sensor 1220. In the embodiment of FIGS. 12a and 12b, the fiber may remain in a curved state ready to be measured by the sensor 1220 and thus unlike the earlier described embodiment the sensor 1220 does not have to push the fiber into the recessed area 1214 to create the curved portion.

Figure 13:
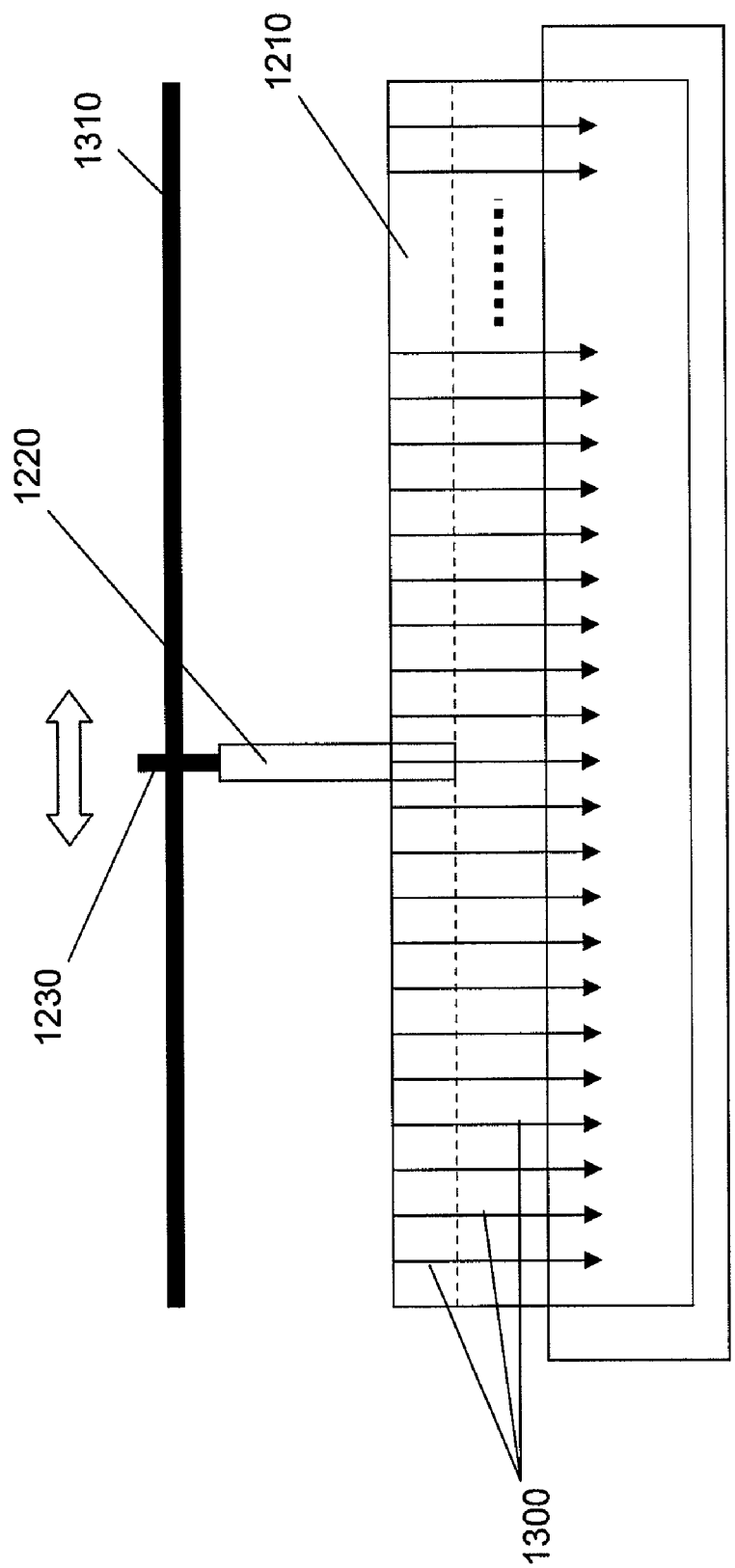
FIG. 13 is a schematic diagram of the interaction of the sensor and a row of test sites consistent with the embodiment of FIGS. 12a and 12b.

FIG. 13 illustrates a plurality of fibers 1300 extending across a rail 1210 and defining a column of test sites consistent with the embodiment illustrated in FIG. 12a. The sensor 1220 may be movable to any of the test sites via the positioner member 1230 in communication with a drive system 1310.

Figure 14:
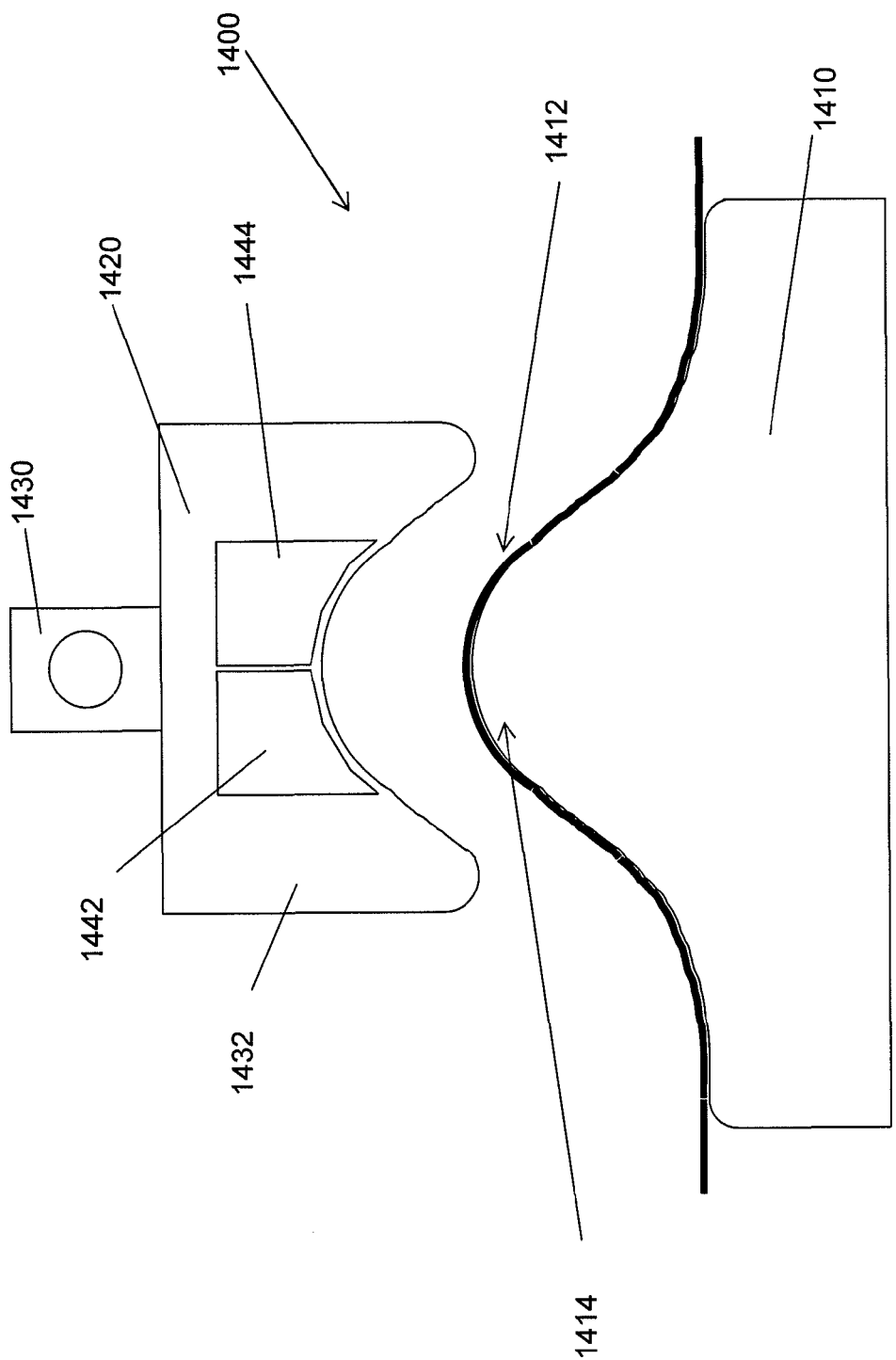
FIG. 14 illustrates a sensor and a test site consistent with yet another embodiment.
Figure 15:
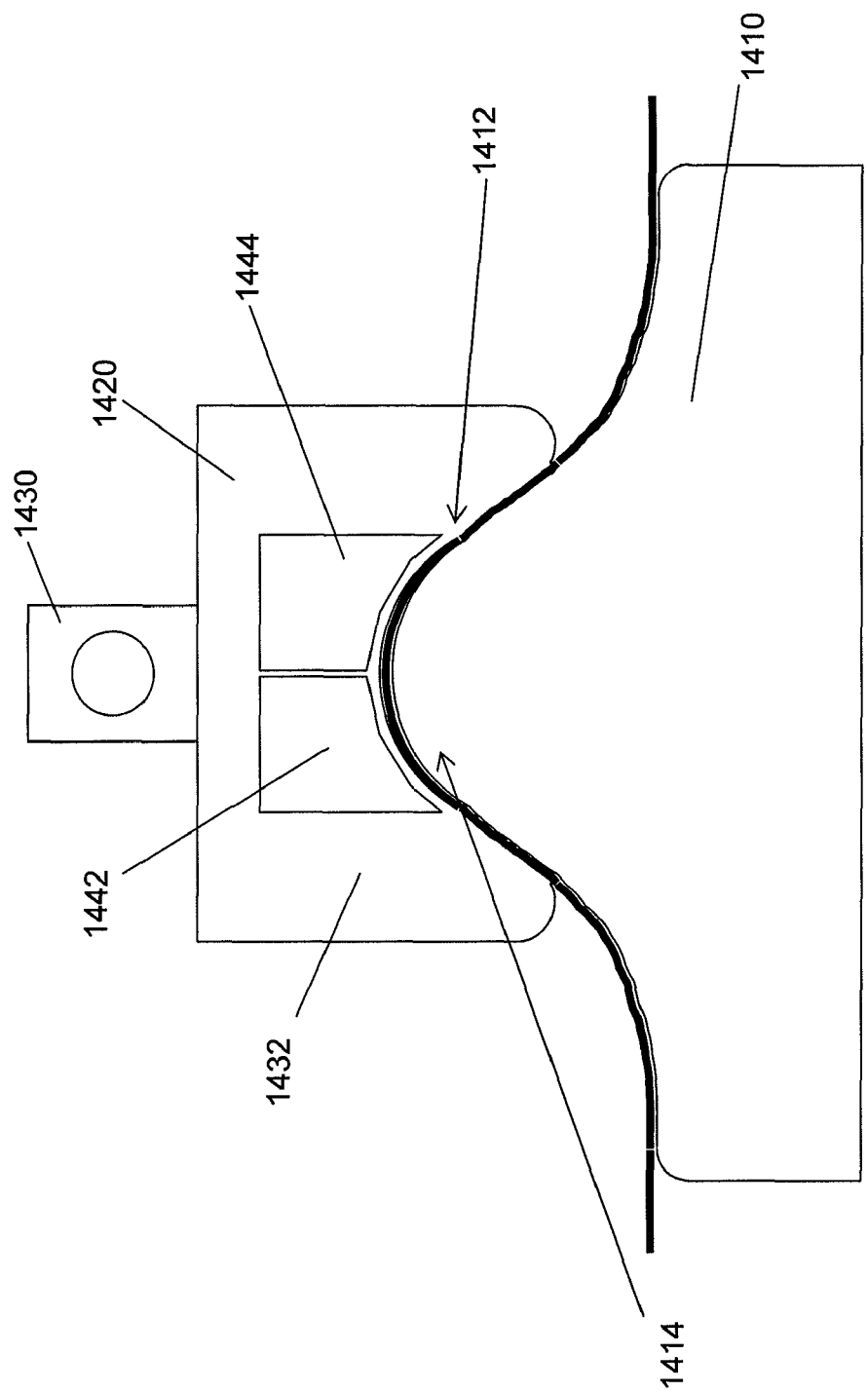
FIG. 15 illustrates the sensor and the test site of FIG. 14, wherein the sensor is engaging the test site.

FIGS. 14 and 15 illustrate yet another embodiment of a sensor 1420 and a test site 1400. According to this embodiment, the cross-section profile of the rail 1410 is generally convex, i.e., a portion of top surface of the rail curves outwardly, referred to as the curved portion 1414. The portion 1412 of the fiber that extends across and is partially supported by the rail 1410 follows the curved portion 1414 of the top surface. The curve in the portion 1412 of the fiber may create macro-bending losses that may be measured by the sensor 1420 as an indication of the optical power level in the fiber.

The sensor 1420 according to the embodiment of FIGS. 14 and 15 may include a positioner member 1430, a shape member 1432, and a photo detector 1440. The positioner member 1430 may be in communication with a drive system (not illustrated in FIGS. 14 and 15) for moving the sensor 1420 to different test sites. The shape member 1432 may define a profile that corresponds at least partially to the profile of the rail 1410 such that a bottom surface 1434 of the shape member 1432 may be pressed against or otherwise engage the curved portion of the top surface of the rail 1410 as best seen in FIG. 15. The photo detector 1440 may include a first detector member 1442 for measuring light coming from a first side of the sensor 1420 and a second detector member 1444 for measuring light coming from a second side of the sensor 1420. In FIGS. 14 and 15, the fiber remains in a curved state ready to be measured by the sensor 1220.

Figure 16:
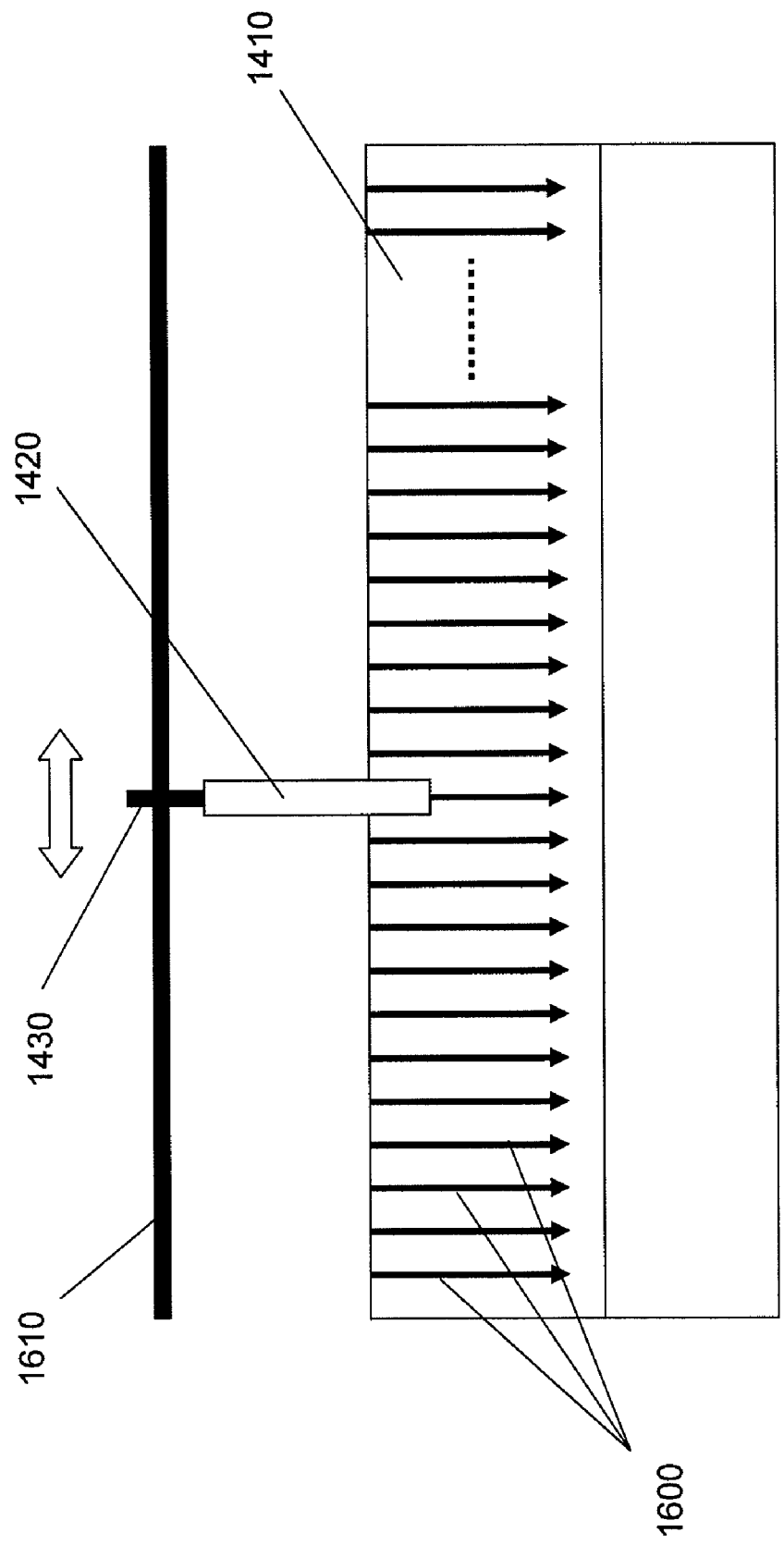
FIG. 16 is a schematic diagram of the interaction of the sensor and a row of test sites consistent with the embodiment of the FIG. 14.

FIG. 16 illustrates a plurality of fibers 1600 extending across a rail 1410 and defining a column of test sites consistent with the embodiment illustrated in FIGS. 14 and 15. The sensor 1420 may be movable to any of the test links via the positioner member 1430 in communication with a drive system 1610.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A system comprising:
   a base;
   at least one rail connected to the base, the at least one rail having at least one test site that supports a portion of a fiber; and
   at least one sensor movable to the at least one test site,
   where at the at least one test site, the at least one sensor is configured to measure an optical power level of the fiber based on a macro-bending loss at the portion of the fiber supported at the at least one test site.

2. The system according to claim 1, where the at least one rail defines a curved portion that curves the portion of the fiber, at the at least one test site, as the portion extends across the at least one rail.

3. The system according to claim 1, where the at least one rail includes a recessed area and,
   where, at the at least one test site, the at least one sensor is configured to engage the portion of the fiber toward the recessed area to create a curve in the fiber.

4. The system according to claim 1 further comprising an interface panel including one or more user inputs to allow a user to select a fiber out of a plurality of fibers to be tested.

5. The system according to claim 4, where the interface panel further includes at least one display for indicating the optical power level of the fiber selected for testing.

6. The system according to claim 1, where the at least one sensor includes a photo detector having a first detector member configured to sense a level of light coming from a first side of the sensor and a second detector member configured to sense a level of light coming from a second side of the sensor.

7. An assembly comprising:
at least one patch panel having one or more adapters, where the one or more adapters are configured to couple a first plurality of fibers to a second plurality of fibers; and
a test system including:
a base that has at least one rail defining a plurality of test sites, where the at least one rail includes a curved portion to create a curve in a portion of a fiber of the first plurality of fibers, and where each of the plurality of test sites is configured to support the portion of the fiber of the first plurality of fibers, and
a sensor that is movable to each of the plurality of test sites to determine an optical power level for each of the fibers of the first plurality of fibers based on a macro-bending loss at the curve; and
a housing configured to at least partially support the at least one patch panel and the test system.

8. The assembly according to claim 7, where the at least one rail has a curved portion that creates the curve in the portion of the fiber of the first plurality of fibers, at a test site, as the portion extends across the at least one rail.

9. The assembly according to claim 7, where the at least one rail defines a recessed area, and
where, at each of the plurality of test sites, the sensor is configured to engage the portion of the fiber toward the recessed area to create the curve in the portion of the fiber.

10. The assembly according to claim 9, where the test system further includes:
a first support member and a second support member to support, in conjunction with the at least one rail, the first plurality of fibers in proximity to the plurality of test sites;
a plurality of first biasing members, each coupled to the first support member and to a respective fiber of the first plurality of fibers; and
a plurality of second biasing members, each coupled to the second support member and to the respective fiber of the first plurality of fibers;
where the plurality first biasing members and the plurality of second biasing members each store slack in the respective fiber and release slack in the respective fiber when the respective fiber is engaged by the sensor.

11. The assembly according to claim 7, where the testing system further includes:
an interface panel including one or more user inputs for allowing a user to select a fiber of the first plurality of fibers to be tested.

12. The assembly according to claim 11, where the interface panel is generally parallel to the at least one patch panel.

13. The assembly according to claim 11, where the interface panel further includes:
at least one display for indicating the optical power level of the fiber selected for testing.

14. The assembly according to claim 7, where the sensor includes a photo detector having a first detector member configured to sense a level of light coming from a first side of the sensor and a second detector member configured to sense a level of light coming from a second side of the sensor.

15. The assembly according to claim 7 further comprising a plurality of the patch panels and a plurality of the rails of the testing system.

16. The assembly according to claim 7 further comprising a drive system for moving the sensor to each of the plurality of test sites.

17. An assembly comprising:
a plurality of fibers, each of the plurality of fibers having a first end and a second end;
at least one optical patch panel having a plurality of adapters, the second ends of the plurality of fibers attached to the plurality of adapters; and
a test system including:
a base that has at least one rail defining a plurality of test sites, where the plurality of fibers extend across a curved portion of the at least one rail, at the plurality of test sites, that creates a curve in the plurality of fibers and,
a sensor that is movable to each of the plurality of test sites to determine an optical power level for each fiber of the plurality of fibers based on a macro-bending loss at each of the plurality of curves.

18. The assembly according to claim 17, where the at least one rail has a generally curved portion that creates the curve in each of the plurality fibers.

19. The assembly according to claim 17, where the at least one rail defines a recessed area, and
where, at each of the plurality of test sites, the sensor is configured to engage a portion of a fiber of the plurality of fibers toward the recessed area to create the curve in the fiber.

20. The assembly according to claim 17, where the testing system further includes:
an interface panel including one or more user inputs for allowing a user to select a fiber of the first plurality of fibers to be tested; and
at least one display for indicating the optical power level of the fiber selected for testing.

21. A method comprising:
moving at least one moveable sensor to at least one test site that supports a portion of a fiber, where the at least one test site is located on a rail;
measuring, using the at least one moveable sensor, a macro-bending loss at the portion of the fiber supported at the at least one test site; and
calculating an optical power level of the fiber based on the measured macro-bending loss.

22. The method of claim 21, further comprising:
curving the portion of the fiber across a curved portion of the rail.

23. The method of claim 21, further comprising:
engaging, using the at least one sensor, the portion of the fiber toward a recessed area in the rail to create a curve in the fiber.

* * * * *